United States Patent
Yamazaki et al.

(10) Patent No.: US 6,468,842 B2
(45) Date of Patent: *Oct. 22, 2002

(54) LASER ILLUMINATION SYSTEM

(75) Inventors: Shunpei Yamazaki, Tokyo (JP); Koichiro Tanaka, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/811,701

(22) Filed: Mar. 20, 2001

(65) Prior Publication Data

US 2001/0019861 A1 Sep. 6, 2001

Related U.S. Application Data

(62) Division of application No. 09/203,613, filed on Dec. 2, 1998, now Pat. No. 6,210,996, which is a division of application No. 08/579,396, filed on Dec. 27, 1995, now Pat. No. 5,854,803.

(30) Foreign Application Priority Data

Jan. 13, 1995 (JP) ................................. 7-21011
Jan. 24, 1995 (JP) ................................. 7-27454

(51) Int. Cl.$^7$ .......................... H01L 21/00; H01L 24/84
(52) U.S. Cl. ..................... 438/151; 438/152; 438/166; 438/167; 438/487
(58) Field of Search ................. 438/150, 152, 438/161, 166, 151, 487, 167

(56) References Cited

U.S. PATENT DOCUMENTS

| | | |
|---|---|---|
| 4,733,944 A | 3/1988 | Fahlen et al. |
| 4,879,176 A * | 11/1989 | Ouderkirk et al. .......... 427/340 |
| 4,916,319 A | 4/1990 | Telfair et al. |
| 4,970,546 A | 11/1990 | Suzuki et al. |
| 5,097,291 A | 3/1992 | Susuki |
| 5,119,390 A | 6/1992 | Ohmori |
| 5,140,600 A | 8/1992 | Rebhan |
| 5,162,239 A | 11/1992 | Winer et al. |
| 5,210,766 A | 5/1993 | Winer et al. |
| 5,266,532 A * | 11/1993 | Russell et al. .............. 438/708 |
| 5,383,199 A | 1/1995 | Laudenslager et al. |
| 5,404,366 A | 4/1995 | Wakabayashi et al. |
| 5,463,650 A | 10/1995 | Ito et al. |
| 5,473,412 A | 12/1995 | Ozawa |
| 5,529,951 A | 6/1996 | Noguchi et al. |
| 5,544,182 A | 8/1996 | Nagaishi et al. |
| 5,608,492 A | 3/1997 | Sato |
| 5,609,780 A | 3/1997 | Freedenberg et al. |
| 5,815,494 A | 9/1998 | Yamazaki et al. |
| 5,854,803 A * | 12/1998 | Yamazaki et al. ............. 372/31 |
| 5,858,473 A | 1/1999 | Yamazaki et al. |
| 5,869,803 A | 2/1999 | Noguchi et al. |
| 6,008,101 A * | 12/1999 | Tanaka et al. .............. 257/325 |
| 6,210,996 B1 * | 4/2001 | Yamazaki et al. .......... 438/150 |

FOREIGN PATENT DOCUMENTS

| | | |
|---|---|---|
| JP | 57-180120 | 11/1982 |
| JP | 58-096883 | 7/1983 |
| JP | 62-021207 | 1/1987 |
| JP | 02-119128 | 5/1990 |
| JP | 02-177422 | 7/1990 |
| JP | 03-286518 | 3/1991 |
| JP | 05-048190 | 2/1993 |
| JP | 05-234885 | 9/1993 |
| JP | 06-302897 | 10/1994 |

* cited by examiner

Primary Examiner—Michael S. Lebentritt
(74) Attorney, Agent, or Firm—Eric J. Robinson; Robinson Intellectual Property Law Office

(57) ABSTRACT

The illumination energy of an excimer laser is measured and adjusted to always effect illumination at constant energy. A laser beam output from an optics is reflected by a mirror, and applied to a sample. A beam profiler is disposed behind the mirror to measure the energy of an illumination laser beam. An energy attenuating device disposed between another mirror and the optics is operated based on the measurement value so that the energy of the laser beam applied to the sample is kept constant.

53 Claims, 5 Drawing Sheets

LASER ILLUMINATION SYSTEM

BACKGROUND OF THE INVENTION

1. Field of the Invention

The present invention relates to the configuration of a laser apparatus used for a semiconductor device manufacturing process and other purposes. In particular, the invention relates to a laser apparatus used to improve or restore, by application of laser light, the crystallinity of a semiconductor material partially or fully made of an amorphous component, a substantially intrinsic, polycrystalline semiconductor material, or a semiconductor material whose crystallinity has been lowered being damaged by ion application, ion implantation, ion doping, or the like.

The invention also relates to a laser illumination system used for a low-temperature process for producing TFTs that are used in a liquid crystal display device and, more specifically, to a technique for forming, on the same substrate, thin-film transistors having a large mobility disposed in a peripheral circuit area and a number of thin-film transistors having uniform characteristics disposed in association with respective pixels.

2. Description of the Related Art

A panel used in a process for manufacturing a liquid crystal display generally has a peripheral circuit area and a pixel area. The peripheral circuit area has a role of controlling the value of a current flowing through each pixel. As semiconductor devices in the peripheral circuit area have a larger mobility, the circuit configuration of the display can be made simpler and the display is allowed to operate at higher speed. On the other hand, pixels have a role of holding information sent from drivers. If semiconductor devices in the pixel area do not have a sufficiently small off-current, they cannot hold such information. Further, if off-current values are much different from one pixel to another, the pixels display differently the same information sent from the drivers. For the above reasons, a technique is now required which allows semiconductor devices having different characteristics to be selectively formed on the same substrate.

In recent years, extensive studies have been made to decrease the temperature of semiconductor device manufacturing processes. This is largely due to the necessity of forming semiconductor devices on an insulative substrate made of glass or the like, which substrate is inexpensive and has high workability. In general, when a glass substrate is exposed to a high-temperature atmosphere of 600° C. or more, it expands or is deformed, for instance. Therefore, it is now desired that the temperature of semiconductor device manufacturing processes be reduced as much as possible. The decrease of the process temperature is also required from miniaturization and multi-layering of devices.

In semiconductor device manufacturing processes, it is sometimes necessary to crystallize an amorphous component of a semiconductor material or an amorphous semiconductor material, to return to the original crystalline level the crystallinity of a semiconductor material which has been lowered by ion application, or to improve the crystallinity of an already crystalline semiconductor material. This is because if such materials are crystallized, the mobility of resulting semiconductor devices can be made very large.

Conventionally, thermal annealing is used for the above purpose. Where silicon is used as a semiconductor material, the crystallization of an amorphous material, the restoration of an original crystallinity level, the improvement of crystallinity, etc. are attained by performing thermal annealing at 600 to 1,100° C. for at least several tens of hours.

In general, the processing time of such thermal annealing can be shortened as the temperature increases. On the other hand, almost no improvement is obtained at a temperature lower than 500° C. Therefore, to decrease the process temperature, it is necessary to replace a conventional thermal annealing step with some other proper step.

There is known, as one of the techniques for satisfying the above need are, a technique of performing various kinds of annealing by laser light illumination. Since laser light can supply high energy equivalent to that of thermal annealing to a desired, limited portion, this technique has an advantage that it is not necessary to expose the entire substrate to a high-temperature atmosphere. In general, there have been proposed two laser light illumination methods.

In a first method, a CW laser such as an argon ion laser is used and a spot-like beam is applied to a semiconductor material. A semiconductor material is crystallized such that it is melted and then solidified soon due to a sloped energy profile of a beam and its movement.

In a second method, a pulsed oscillation laser such as an excimer laser is used. A semiconductor material is crystallized such that it is instantaneously melted by application of a high-energy laser pulse and then solidified.

The first method of using a CW laser has a problem of long processing time, because the maximum energy of the CW laser is insufficient and therefore the beam spot size is at most several millimeters.

In contrast, the second method using a pulse oscillation laser can provide high mass-productivity, because the maximum energy of the laser is very high and therefore the beam spot size can be made as large as several square centimeters.

However, to process a single, large-area substrate with an ordinary square or rectangular beam, the beam needs to be moved in the four orthogonal directions, which still remains to be solved from the viewpoint of mass-productivity.

This aspect can be greatly improved by deforming a beam into a linear shape that is longer than the width of a subject substrate, and scanning the substrate with the beam.

The remaining problem is insufficient uniformity of laser light illumination effects. Pulsed oscillation lasers as represented by an excimer laser in which laser oscillation is obtained by gas discharge have a tendency that the energy somewhat varies from one pulse to another. Further, the degree of the energy variation also varies with the output energy. In particular, when illumination is performed in an energy range where stable laser oscillation cannot be obtained easily, it is difficult to perform laser processing with uniform energy over the entire substrate surface.

Another problem associated with the use of a pulsed oscillation laser is that the laser light energy decreases as the laser is used over a long time, which attributes to degradation of a gas necessary for laser oscillation. This does not appear to be a serious problem because the laser light energy can be increased by raising its operation level. However, in practice, raising the operation level is not preferable because once the operation level is changed, it takes some time for the laser light energy to be stabilized.

By the way, it is conventionally very difficult to produce, only with laser light illumination, a crystalline silicon film having such a large mobility as enables fast operation of a liquid crystal display. In view of this, a method of improving the crystallinity after laser light illumination has been proposed in which thermal annealing for crystallization is performed at about 550° C. for several hours before the laser light illumination. Although this method can attain a mobility (about 20 cm$^2$/Vs) as required for the pixel area and the off-current is small (about 10$^{-12}$ A) and has a small pixel-to-pixel variation (on the same order), it cannot provide a mobility (more than 100 cm$^2$/Vs) as required for the driver area.

We have already proposed the following method for solving this problem.

In the first step, a metal element such as Ni is added to a semiconductor material that is deposited on a glass substrate. Various substances other than Ni can be used as long as they serve as nuclei when the semiconductor material is crystallized. However, according to our experiments, in the case where the semiconductor material is amorphous silicon, the addition of Ni effectively produced silicon films having the best crystallinity. The following description will be limited to the case where the impurity is Ni.

Among various methods of adding the impurity is a method of applying a nickel acetate salt solution to the surface of a semiconductor material.

In the second step, the Ni-added semiconductor material is kept at a high temperature. Where the semiconductor material is an amorphous silicon thin film, a crystalline silicon film is produced by keeping the Ni-added amorphous silicon thin film for 4 hours in an atmosphere of 550° C. During this heat treatment step, Ni penetrates through the semiconductor material and crystal growth proceeds with Ni serving as nuclei. Thus, a crystalline film of the semiconductor material is produced.

In the third step, a film having better crystallinity is produced by applying laser light to the semiconductor material. The above-described linear laser light is used in this step. The laser light illumination is performed such that before application of strong pulsed laser light, preliminary illumination is conducted with weaker pulsed laser light. This allows formation of a semiconductor film having highly uniform crystallinity. The two-step illumination is effective in suppressing degradation of the uniformity of the film surface due to laser light illumination.

The reason why the preliminary illumination is effective in obtaining a uniform film is that a crystalline silicon film obtained by the preceding steps still includes many amorphous portions in which the absorption factor of laser light energy is much different from that of a polycrystalline film. That is, the residual amorphous portions are crystallized by the-first illumination, and the total crystallization is accelerated by the second illumination. The two-step illumination is very advantageous, and can greatly improve the characteristics of completed semiconductor devices.

To reduce the degree of abrupt temperature change of a silicon film surface due to laser light illumination, it is preferred that during the laser light illumination a substrate be kept at 100 to 600° C. It is known that in general an abrupt change in environmental conditions impairs the uniformity of a substance. By keeping the substrate temperature high, the degradation of the uniformity of a substrate surface due to laser light illumination can be minimized. No particular atmosphere control is performed; i.e., the illumination is performed in the air.

The mobility of a crystalline film thus produced depends on the semiconductor material and the laser light energy. Where the semiconductor material is silicon, a crystalline silicon film having a mobility of more than 100 cm$^2$/Vs can be obtained. Although the mobility generally increases as the laser light energy is increased, it starts to decrease at a certain high energy level.

Although thin-film transistors formed by using a crystalline silicon film produced by the above method have a high mobility, they have large off-current values that vary very much from one transistor to another (two to five orders). (The off-current variation becomes almost unnoticeable if the laser light energy is so reduced as to provide a mobility of 20 cm$^2$/Vs.) The variation of off-current values adversely affect the pixels, and causes point defects and line defects in a completed liquid crystal display.

As described above, a pixel-to-pixel variation of the off-current in the pixel area causes fatal defects for the operation of a liquid crystal display. However, it has been proved that a variation of off-current values of thin-film transistors disposed in the peripheral circuit area does not have large influences on the operation of a liquid crystal display. It has also been proved that while a large mobility (larger than 100 cm$^2$/Vs) is required for the peripheral circuit area, a relatively small mobility (about 20 cm$^2$/Vs) is sufficient for the pixel area.

Based on the above discussions, an appropriate laser light application scheme is such that high-energy laser light is applied to the peripheral circuit area and low-energy laser light is applied to the pixel area (see FIG. 8).

However, the scheme of individually applying laser beams of different energies to the peripheral circuit area and the pixel area makes the laser light illumination step complex and time-consuming. For example, if the peripheral circuit area is illuminated while the pixel area is masked, and vice versa, this process takes long time and becomes complex because of two times of illumination. Further, if the above-described two-step illumination is employed, this scheme needs four times of illumination.

SUMMARY OF THE INVENTION

An object of the present invention is to provide, by solving the above problems, a laser illumination system which can perform illumination at constant laser energy even using a pulsed oscillation laser.

Another object of the invention is to provide an apparatus which allows the above-described laser light illumination method to be performed in short time in a simple way.

To attain the above objects, the invention is characterized in that an energy attenuating device as represented by a light attenuation filter and an energy measuring device as represented by a beam profiler are used in combination.

That is, in the invention, a laser is oscillated at an output level at which the laser operates in as stable a state as possible. Further, by additionally using the energy attenuating device, the laser light intensity is adjusted to illuminate an object at an optimum energy.

In the invention, it is preferred that the energy attenuation factor of the energy attenuating device be continuously variable. But it may be discretely variable. That is, the invention is summarized such that the laser light energy as output is set higher than the above-mentioned optimum energy and the laser light energy is adjusted to the optimum energy by using the energy attenuating device. In doing so, the laser is caused to operate in an energy range where it can oscillate in as stable a state as possible. As the laser continues to oscillate over a long time, the laser light energy tends to decrease. In the invention, this energy reduction is compensated by adjusting the energy attenuating device. That is, the invention is characterized by enabling laser light illumination to be always performed at a constant energy by attenuating, in the initial stage, the laser light energy by the energy attenuating device by an amount equal to the energy reduction in the final stage, and gradually reducing the attenuation factor as the laser light illumination proceeds. This is why it is preferred that the energy attenuating device is continuously variable.

According to another aspect of the invention, a laser illumination apparatus producing a large-area beam spot is combined with a device (hereinafter called an energy attenuating device) capable of attenuating the energy of the large-area laser beam at different attenuation factors for respective portions of the beam. By virtue of using such an energy attenuating device, laser light illumination is conducted only once, which contributes to increase of the throughput. Even if the invention is combined with the above-described two-step illumination, illumination is conducted only two times.

If the energy measuring device is added to the above system, the laser light energy can be controlled more precisely. In general, pulsed lasers such as an excimer laser has a tendency that a certain degree of variation occurs in the laser light energy even if the laser output is kept constant. This problem may be solved by, for instance, changing the laser output itself (operation level) in accordance with a variation of the laser light energy, or by changing the energy attenuation factor of the energy attenuating device. The former method is not appropriate in the case where the laser light energy needs to be controlled very precisely, because the laser oscillation itself becomes unstable when the laser output is changed. On the other hand, since the latter method does not change the laser output, the laser oscillation does not become unstable. Thus, the latter method is advantageous over the former method. However, the latter method needs to use the energy attenuating device having a variable energy attenuation factor.

The laser illumination system having the above configuration enables formation of a silicon film having regions of different electrical characteristics on the same substrate by changing the laser light illumination energy. Further, by using the above-described energy attenuating device, it becomes possible to perform laser processing with throughput equivalent to that as would be obtained when laser illumination is conducted without changing the laser light illumination energy. By forming a number of TFTs on the thus-produced silicon film, TFTs having a large mobility and TFTs having a small off-current can be formed on the same substrate. By using this technique, an active matrix liquid crystal display device can be constructed in which the peripheral circuit area is constituted of TFTs having a large mobility and the pixel area is constituted of TFTs having a small off-current.

DETAILED DESCRIPTION OF THE PREFERRED EMBODIMENTS

Embodiment 1

Figure 1:
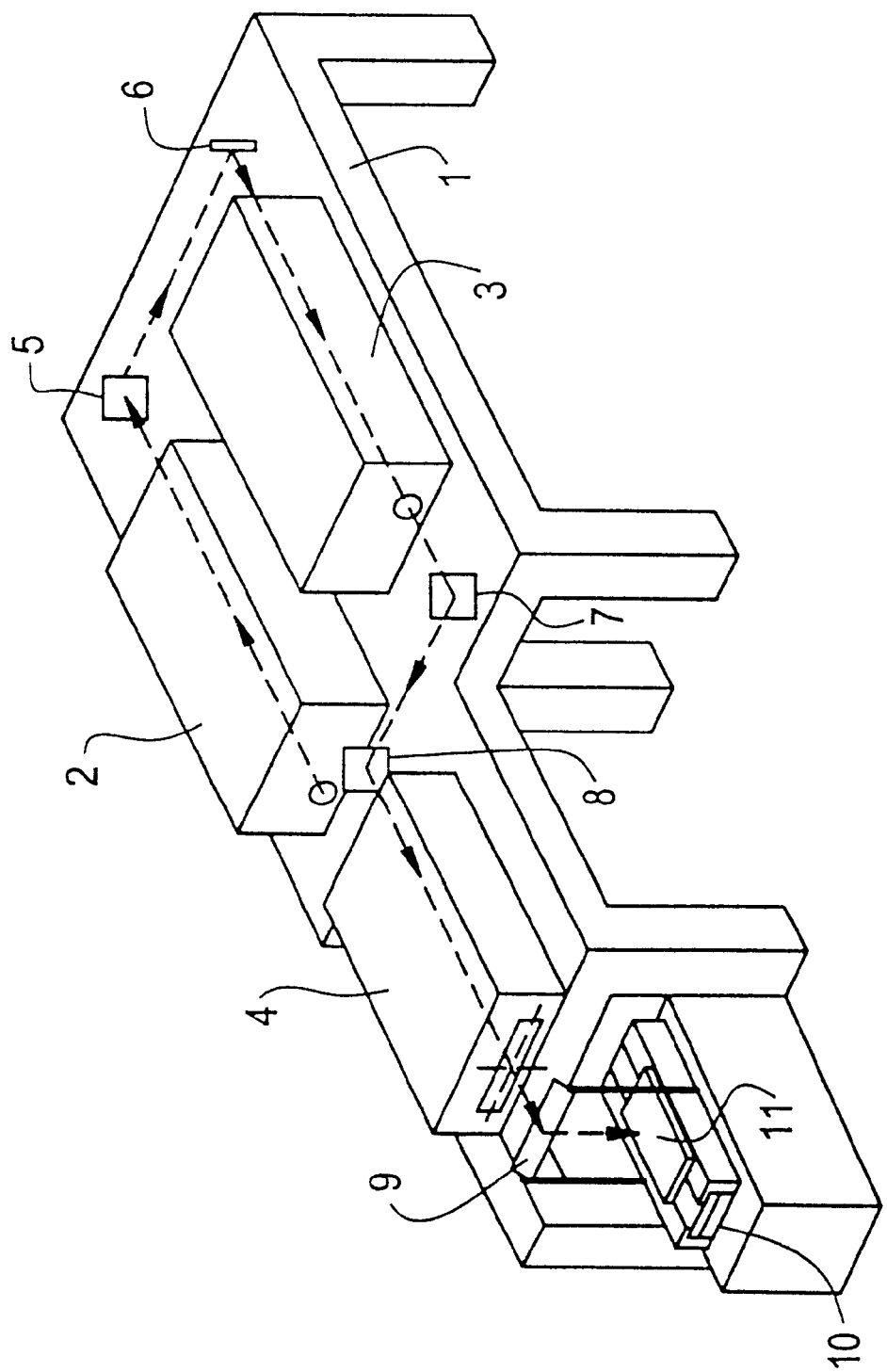
FIG. 1 shows a general configuration of a laser annealing apparatus used in a first embodiment of the invention.

First of all, a description will be made of an apparatus. FIG. 1 shows the concept of a laser annealing apparatus used in this embodiment. Reference numeral 1 denotes a main body of the laser annealing apparatus. An oscillator 2 emits KrF excimer laser light (wavelength: 248 nm; pulse width: 25 ns). Apparently other excimer lasers and other types of laser may also be used.

Figure 3:
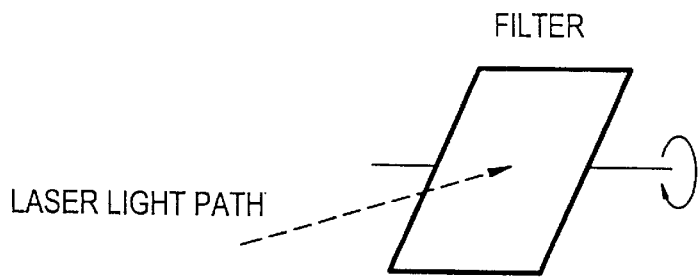
FIG. 3 shows a light attenuation filter.
Figure 4:
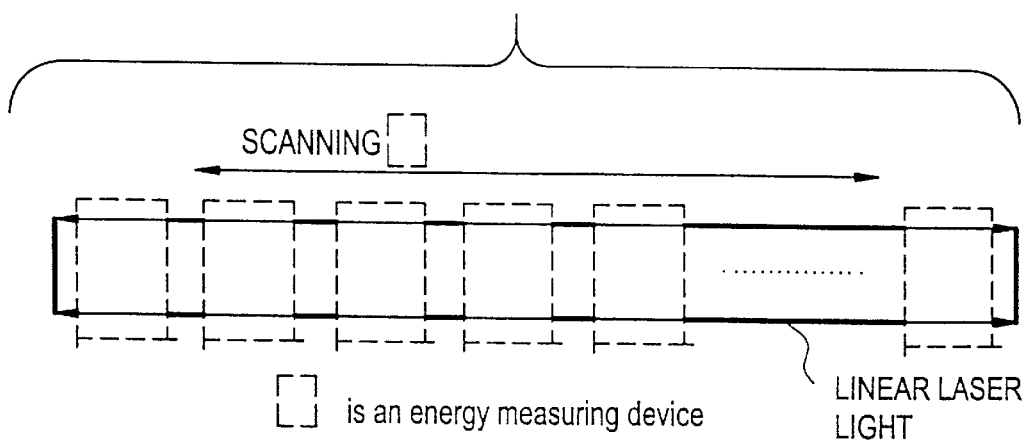
FIG. 4 illustrates how to measure the energy of a linear laser beam.

Laser light emitted from the oscillator 2 is reflected by full-reflection mirrors 5 and 6, amplified by an amplifier 3, reflected by full-reflection mirrors 7 and 8, and introduced into an optics 4. Although not shown in FIG. 4, an energy attenuating device is inserted between the mirror 8 and the optics 4. FIG. 3 shows the configuration of the energy attenuating device.

As shown in FIG. 3, the energy attenuating device is of a type in which a single plate of filter faces a traveling laser beam and the energy transmission factor is changed by changing the angle formed by the beam and the filter.

The laser beam immediately before entering the optics 4 has a rectangular shape of about 3×2 cm$^2$. It is shaped by the optics 4 into a long and narrow (i.e., linear) beam having a length of 8 to 30 cm and a width of 0 to 0.5 mm. The laser light as output from the optics 4 has a maximum energy of 1,000 mJ/shot.

The reason for shaping the laser light into the above long and narrow beam is to improve its processibility. After being output from the optics 4, the linear beam is reflected by the full-reflection mirror 9, and applied to a sample 11. Since the beam is longer than the width of the sample 11, the entire sample 11 can be illuminated with the laser beam by moving the sample 11 in one direction. Therefore, the sample stage/driving device 10 can be made simple in configuration and can be maintained easily. Further, the alignment operation in setting the sample 11 can be facilitated.

The sample stage 10 to which the laser beam is applied is controlled by a computer so as to move approximately perpendicularly to the linear laser beam.

Figure 2:
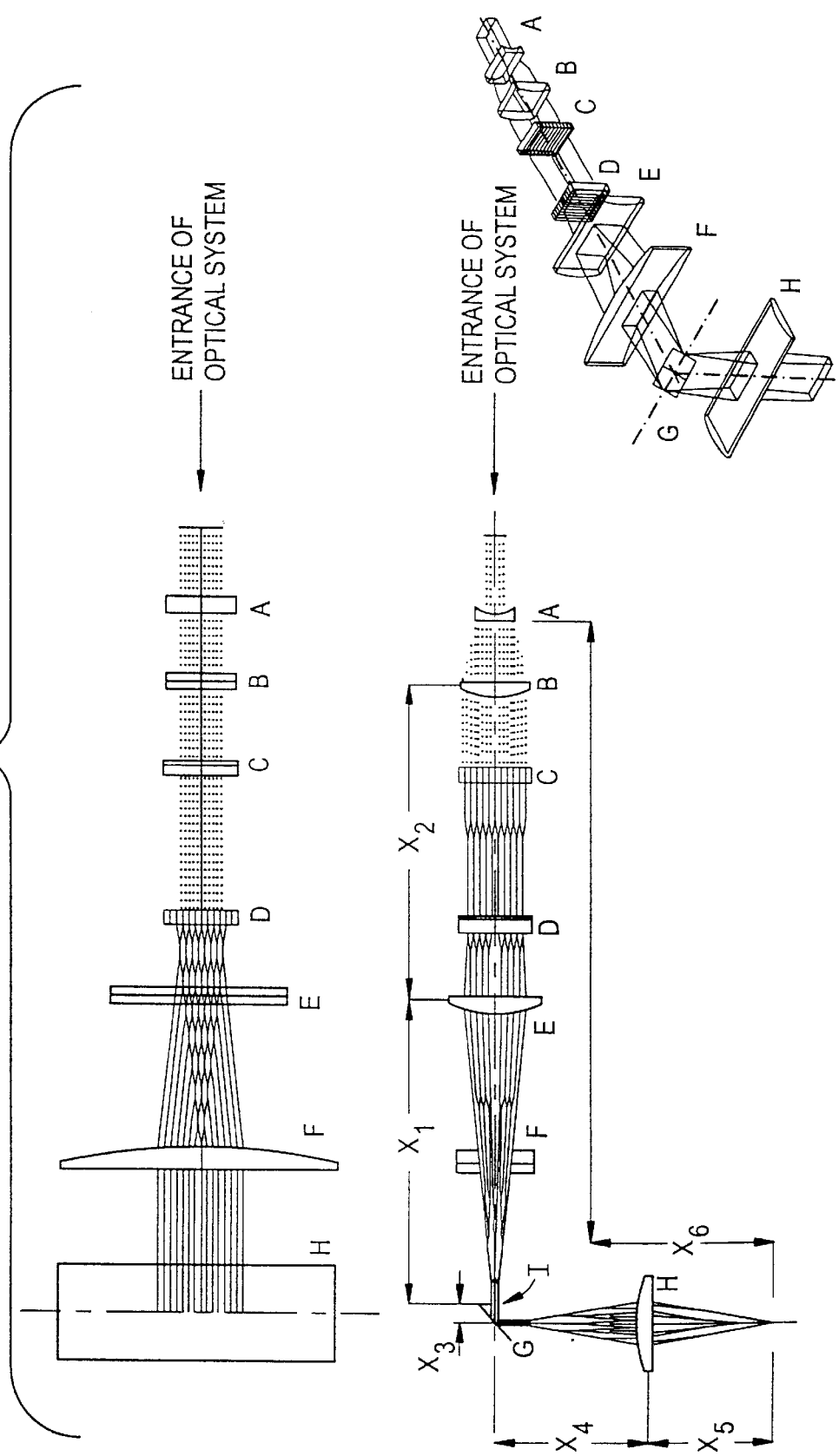
FIG. 2 shows an optics used in the laser annealing apparatus of FIG. 1.

FIG. 2 shows an optical path in the optics 4. A laser beam entering the optics 4 passes through a cylindrical concave lens A, a cylindrical convex lens B, and horizontal and vertical fly-eye lenses C and D, so that an original Gaussian profile is converted into a rectangular profile. Thereafter, the laser beam is passed through cylindrical convex lenses E and f, focused by a cylindrical lens H through a mirror G (corresponds to the mirror 9 in FIG. 1), and applied to the sample 11.

The mirror G (corresponds to the mirror 9 in FIG. 1) is so constructed as to transmit a small part of the laser light energy. Therefore, by disposing a beam profiler behind the mirror G, the laser light energy can be measured even while the laser beam is applied to the sample 11, i.e., on a real-time basis. Since the linear laser beam has a large area, the energy is measured by moving the beam profiler within the linear laser beam to scan it (see FIG. 4). In this manner, even the energy profile of the linear laser beam can be measured.

The above apparatus is designed such that if the energy of the linear laser beam has deviated from a preset energy by a predetermined percentage during laser light illumination, a signal is automatically sent from a beam splitter to the energy attenuating device and the laser energy is returned to the preset energy.

Embodiment 2

Although the mirror G being partially transmissive provides the advantage of real-time measurement of the laser light illumination energy (first embodiment; FIG. 1), it has a disadvantage that part of the laser energy is lost. This embodiment is directed to an apparatus for solving that problem. However, the apparatus of this embodiment cannot measure the energy of the linear laser beam on a real-time basis.

Figure 5:
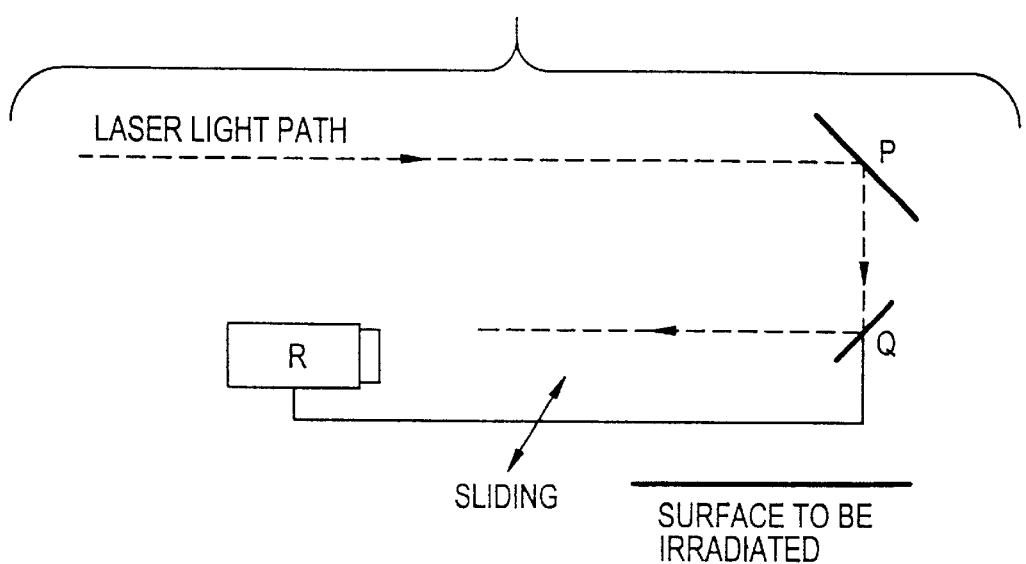
FIG. 5 schematically shows the configuration of a laser illumination system according to a second embodiment of the invention.

FIG. 5 shows a laser light illuminating portion of the apparatus of this embodiment. A mirror P in FIG. 5 corresponds to the mirror G in FIG. 1. The mirror P is a full-reflection mirror, and a 4%-reflection mirror Q is disposed under the mirror P. An energy component reflected by the mirror Q enters a beam profiler R. The mirror Q is smaller than the mirror P, because the beam profiler measures a small area each time. The mirror Q moves in link with the beam profiler R, and is adapted to slide over a range longer than the linear laser beam. During laser light illumination, the mirror Q and the beam profiler are slid outside the linear laser beam. If an object of illumination is shorter than the linear laser beam, the mirror Q may be placed at an end portion of the linear laser beam which portion does not affect the illumination, in which case the energy can be measured even during laser light illumination.

Embodiment 3

We have studied the method for improving the crystallinity of an amorphous or crystalline silicon or silicon compound film by illuminating it with laser light and, in particular, the manufacturing method of a film suitable as a material for a liquid crystal display device, and propose the following apparatus that facilitates manufacture of such a film.

Figure 6:
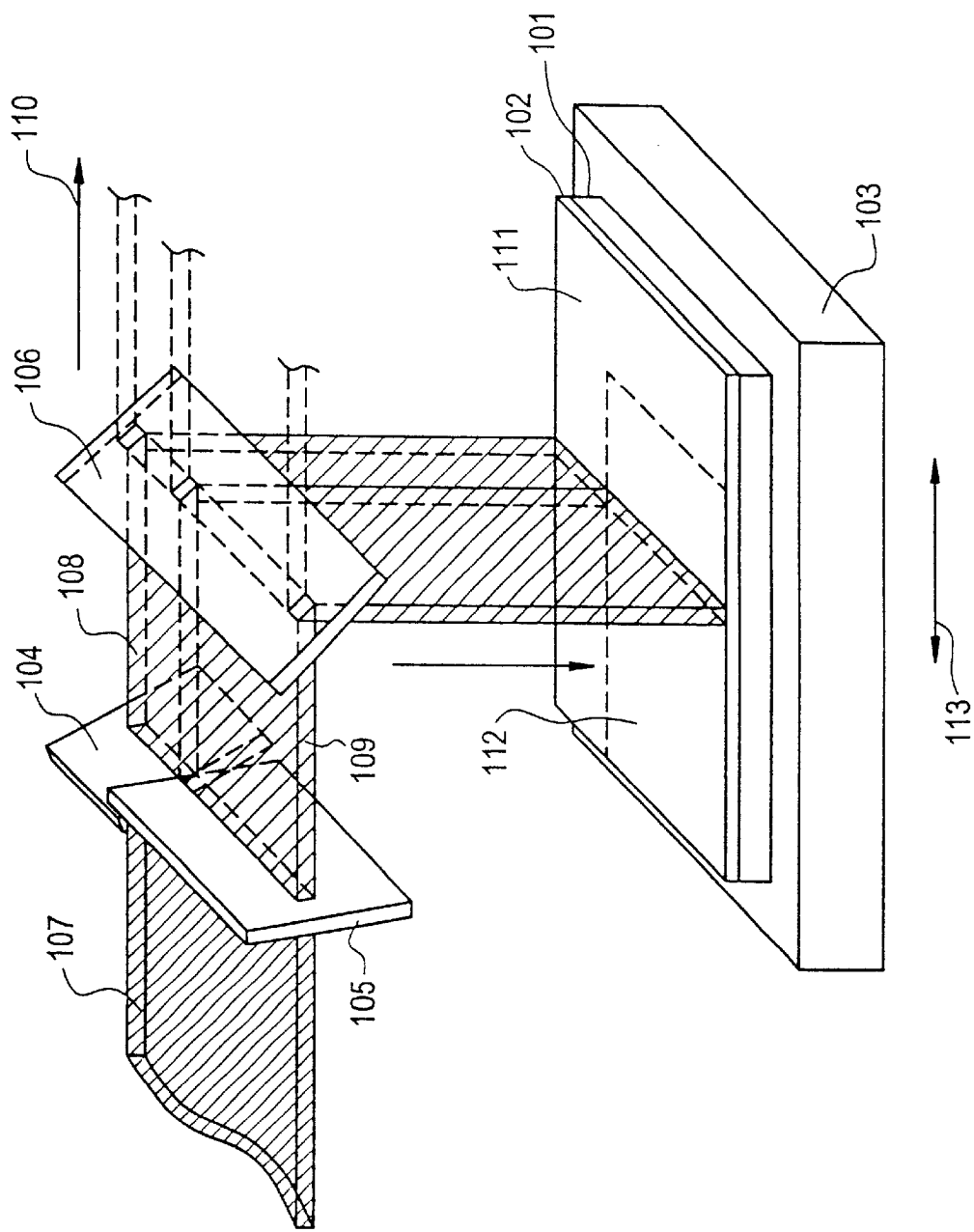
FIG. 6 shows how a laser beam is applied to a sample.

As in the first embodiment, this embodiment uses the laser annealing apparatus shown in FIG. 1. An energy attenuating device is inserted into the output-side optical path of the optics 4 of FIG. 1. FIG. 6 shows the configuration of the energy attenuating device. A brief description will be made of the mechanism of this device. Referring to FIG. 6, the light attenuation factor of each of special light attenuation filters 104 and 105 is changed by changing the angle formed by the laser beam and the filter. The transmission factor of each of the light attenuation filters 104 and 105 is maximum when the filter is perpendicular to the laser beam, and is reduced as the angle decreases from 90°. Although in FIG. 6 the energy attenuating device consists of the two light attenuation filters 104 and 105, there is no limitation on the number of light attenuation filters. Several light attenuation filters may be used in combination depending on the laser light illumination object.

FIG. 6 schematically shows how the laser beam is applied, in which a mirror 106 corresponds to the mirror 9 in FIG. 1, and a sample 101 corresponds to the sample 11 in FIG. 1. A stage 103 corresponds to the stage 10 in FIG. 1, and can move in a direction indicated by arrow 113.

A description will be made of an example of forming a crystalline silicon film on a glass substrate by laser light illumination by using the invention.

First, a glass substrate (for instance, Corning 7959) of 10 cm×10 cm is prepared. A 2,000-Å-thick silicon oxide film (not shown) is formed on the glass substrate by plasma CVD in which TEOS is used as a material. This silicon oxide film serves as a undercoat film for preventing impurities from diffusing into a semiconductor film from the glass substrate side.

An amorphous silicon film is then deposited by plasma CVD. Low-pressure thermal CVD may be used instead of plasma CVD. The thickness of the amorphous silicon film is set at 500 Å. Apparently this thickness may be set as desired.

Subsequently, a silicon oxide film is formed on the surface of the amorphous silicon film by immersing the substrate in excessive water ammonia of 70° C. for 5 minutes. A liquid-phase nickel acetate salt is then applied to the surface of the amorphous silicon film by spin coating. Nickel serves as an element for accelerating crystallization when the amorphous silicon film is crystallized.

Although in this embodiment Ni is used as a metal element for accelerating crystallization of silicon, there may also be used one or a plurality of elements selected from Fe, Co,.Ni, Ru, Rh, Pd, Os, Ir and Pt.

Thereafter, hydrogen is removed from the amorphous silicon film by keeping the substrate at 450° C. for one hour in a nitrogen atmosphere. This is to intentionally form dangling bonds in the amorphous silicon film, to reduce the threshold energy of crystallization later performed. The amorphous silicon film is then crystallized by performing a heat treatment of 550° C. and 4 hours in a nitrogen atmosphere. It is noted that the action of Ni has enabled the crystallization to be performed at a temperature as low as 550° C.

A crystalline silicon film can be formed on the glass substrate in the above manner. FIG. 6 shows a state that a glass substrate 101 formed with a crystalline silicon film 102 is placed on a holder 103. In this state, a KrF excimer laser beam (wavelength: 248 nm; pulse width 25 ns) is applied to the crystalline silicon film 102 by using the apparatus of FIG. 1. The crystallinity of the silicon film can be improved by this laser beam illumination.

The laser beam is converted by beam shape conversion lenses into a rectangular shape to produce an illumination beam area of 125 mm×1 mm. The sample is mounted on the stage 103, and its entire surface is illuminated by moving the stage 103 at a rate of 2 mm/s.

As for the laser beam illumination conditions, two-step illumination consisting of preliminary illumination of 100 to 300 mJ/cm$^2$ and main illumination of 200 to 500 mJ/cm$^2$ is employed, and the pulse rate is set at 30 pulses/s. The two-step illumination is employed to minimize degradation of the uniformity of a film surface due to laser beam illumination, to thereby form a film having better crystallinity. The reason why the crystallinity is improved by this method has already been described in the background part of this specification. The laser beam energy is changed (for instance, from the preliminary illumination to the main illumination) by changing the energy attenuation factor of the energy attenuating device. This is conducted more easily than changing the output energy of the laser itself.

The substrate temperature is kept at 200° C. during the laser beam illumination. This is to reduce the rate of increase and decrease of the temperature of the substrate surface due to the laser beam illumination. While in this embodiment the substrate temperature is set at 200° C., in practice it is set at an optimum value for laser annealing in a range of 100° C. to 600° C. No particular atmosphere control is performed; that is, the illumination is conducted in the air.

A specific laser beam illumination method will be described below, which can be used for either the first or second illumination of the two step-illumination scheme. The amorphous silicon film 102 as the laser beam illumination object of this embodiment is one that has been formed for the purpose of producing a liquid crystal display, and is divided into a peripheral circuit area 111 and a pixel matrix area 112 by a broken line indicated in FIG. 6. The laser beam illumination is conducted while changing the laser beam energy with the broken line as a boundary. The energy attenuating device consisting of the light attenuation filters 104 and 105 is used to change the laser beam energy.

As is understood from FIG. 6, the energy attenuating device can provide different energy attenuation factors for portions of the linear laser beam on both sides of an arbitrary position. Further, even during illumination with the linear laser beam, i.e., during laser beam scanning, the angles formed by the laser beam and the respective light attenuation filters 104 and 105 can be changed independently of each other, to enable illumination at different laser beam energies in a single laser beam scanning operation. By properly combining the above two features, laser processing of the above-mentioned energy distribution can be performed on the illumination object shown in FIG. 6 by a single scan.

Figure 7:
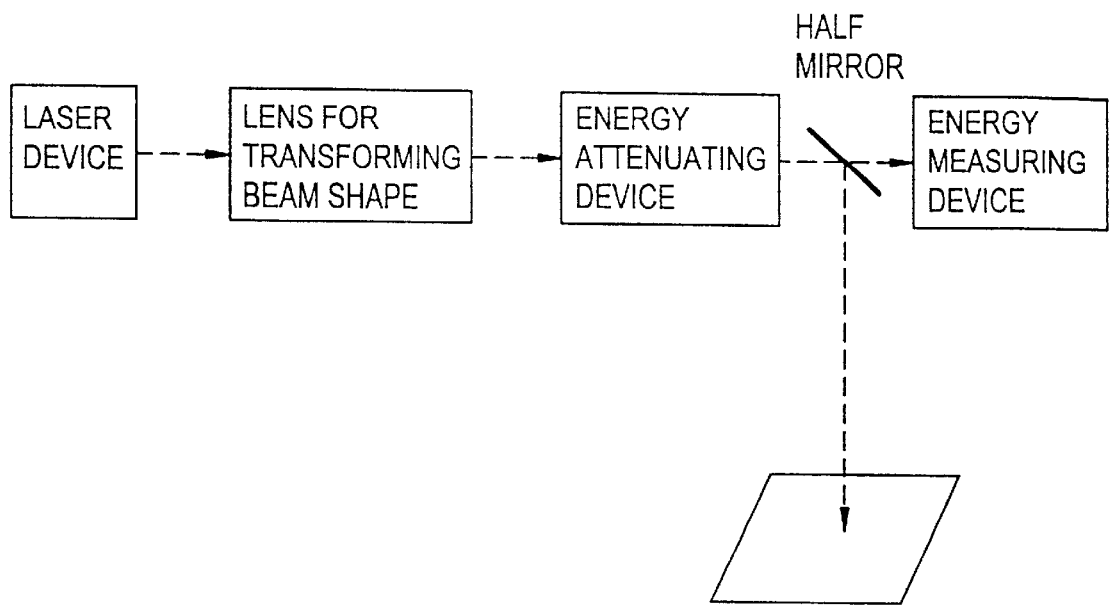
FIG. 7 shows a system for illumination with a laser beam.

A specific illumination method is as shown in FIGS. 6 and 7. A linear laser beam 107 comes from the left side of FIG. 6, passes through the light attenuation filters 104 and 105, reflected by the path-folding mirror 106, and applied to the illumination surface of the amorphous silicon film 102.

Figure 8:
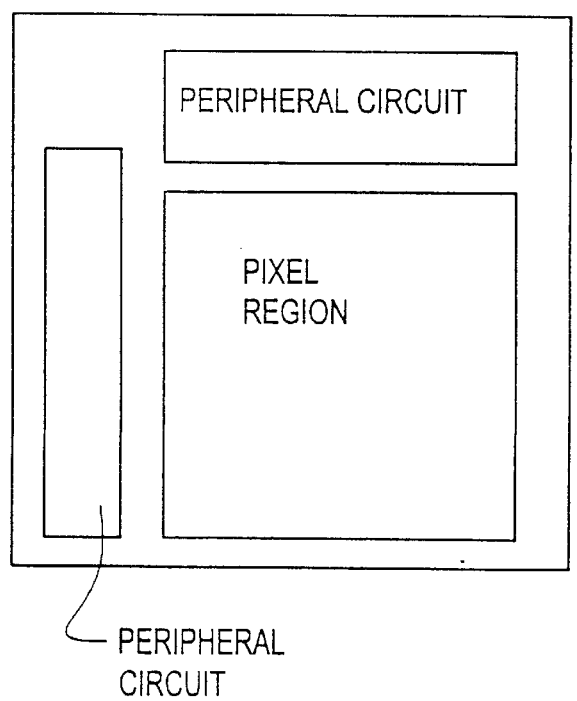
FIG. 8 schematically shows an active matrix liquid crystal panel.

The illumination object shown in FIG. 6 is divided into the peripheral circuit area 111 and the pixel matrix area 112. FIG. 8 schematically shows the configuration of a liquid crystal panel having peripheral circuit areas and a pixel area.

The stage 103 on which the glass substrate 101 formed with the crystalline silicon film 102 is mounted is moved in a direction indicated by arrow 113. Incorporating a heater in its lower portion, the stage 103 can kept the substrate 101 at a desired temperature. A description will now be made of an example in which laser beams having energy densities of 300 mJ/cm$^2$ and 400 m/cm$^2$ are respectively applied to the peripheral circuit forming area 111 and the pixel matrix forming area 112. This is done according to the following procedure.

First, the laser is oscillated with its output set at a value larger than 400 mJ/cm$^2$. Then, the angles of the light attenuation filters 104 and 105 are adjusted so that they have different transmission factors (in this case, so that laser beams 108 and 109 have energy densities of 300 mJ/cm$^2$ and 400 mJ/cm$^2$, respectively). Upon completion of this setting, the laser beams 108 and 109 start to be applied to the substrate 101 from its left side. The stage 103 moves to the left as indicated by arrow 113. At a time instant when the linear laser beam has just finished illumination of the pixel matrix area 112, the angle of the light attenuation filter 105 is changed to the same angle as the light attenuation filter 104. The illumination is continued thereafter. To perform the two-step illumination as described above, the above process may be conducted two times.

Embodiment 4

A description will be made of a case of adding the energy measuring device to the method of the first embodiment. The energy measuring device may be located anywhere as long as the energy of a laser beam passed through the energy attenuating device can be measured. This embodiment is directed to a case where the energy measuring device is located at a position shown in FIG. 7. When a difference between an energy measured by the energy measuring device and a preset energy exceeds a predetermined value, a signal is sent from the energy measuring device to the energy attenuating device, which, in response, changes the energy attenuation factor. Thus, the laser beam energy can be returned to the preset value. This system enables more precise energy control.

The energy measuring device may be added to the optics shown in FIG. 6 such that the path-folding mirror 106 is made partially transmissive and the energy measuring device is disposed on an optical path 110 on the transmission side of the path-folding mirror 106. In this case, a several percentage of each of the laser beams 108 and 109 passes through the path-folding mirror 106, and travels along the optical path 110 to reach the energy measuring device, which measures energies of the laser beams 108 and 109. Based on measured energy values, the angles of the light attenuation filters 104 and 105 are controlled.

The laser beam illumination technique of the invention has made it possible to perform laser processing while minimizing a variation of the laser beam energy. As a result, it is expected that the reproducibility of a laser processing step is improved, and that variations in the characteristics of products that are produced by a manufacturing process including a laser processing step are thereby reduced very much. In particular, the invention can effectively be applied to all the laser processing steps used in semiconductor device manufacturing processes, because such steps tolerate only a small laser beam energy range; that is, a slight difference in energy causes great influences on the characteristics.

The laser illumination system of the invention makes it possible to greatly change the characteristics of a part of a film to constitute semiconductor devices. The invention can be applied to all the laser processing steps used in semiconductor device manufacturing processes. In particular, in the case of semiconductor devices are TFTs for a liquid crystal panel, it becomes possible to produce TFTs for driver devices having a mobility larger than 100 cm$^2$/Vs and TFTs for pixels having a small pixel-to-pixel variation in the characteristics, particularly off-currents of the pixels.

As a result, it becomes possible to increase the movement speed of images of a TFT liquid crystal display device produced by a low-temperature manufacturing process, and to decrease the rate of occurrence of defective substrates having point defects, line defects, or other defects.

As such, the invention is very useful from the industrial point of view.

What is claimed is:

1. A method for forming a thin film transistor comprising:
   forming a semiconductor film comprising silicon over a substrate;
   irradiating a laser light to said semiconductor film; and
   receiving at least a portion of said laser light by an energy measuring device to measure at least a portion of an energy distribution of said laser light thereby.

2. A method for forming a thin film transistor comprising:
   forming a semiconductor film comprising silicon over a substrate;
   irradiating a laser light to said semiconductor film while relatively scanning said semiconductor film with said laser light in order that an energy measuring device measures an energy distribution of at least a portion of said laser light.

3. A method for forming a thin film transistor comprising:
   forming a semiconductor film comprising silicon over a substrate;
   producing a laser light from a laser;
   attenuating said laser light by an energy attenuating device provided separately from said laser; and
   irradiating the attenuated laser light to said semiconductor film.

4. A method for forming a thin film transistor comprising:
   forming a semiconductor film comprising silicon over a substrate;

producing a laser light from a laser;
attenuating said laser light by changing a variable energy attenuation factor of said laser light by an energy attenuating device provided separately from said laser; and
irradiating the attenuated laser light to said semiconductor film.

5. A method for forming a thin film transistor comprising:
forming a semiconductor film comprising silicon over a substrate;
producing a laser light from a laser;
directing said laser light to an energy attenuation filter of an energy attenuating device;
changing an energy attenuation factor of a portion of said laser light by changing an angle formed by said energy attenuation filter and said laser light to output an attenuated laser light; and
irradiating the attenuated laser light to said semiconductor film.

6. A method for forming a thin film transistor comprising:
forming a semiconductor film comprising silicon over a substrate;
producing at least one shot laser light from a laser;
measuring energy distribution of said at least one shot laser light by an energy measuring device to conduct control of said energy distribution; and
irradiating said laser light to said semiconductor film with said energy distribution of said laser light determined by said control.

7. A method for forming a thin film transistor comprising:
forming a semiconductor film comprising silicon over a substrate;
producing a laser light from a laser;
splitting said laser light into a first portion and a second portion;
irradiating said first portion to said semiconductor film; and
directing said second portion to an energy measuring device which measures an energy distribution of said second portion to determine an energy distribution of said first portion.

8. A method according to claim 1 wherein said laser light is an excimer laser light.

9. A method according to claim 1 wherein said laser light has a linear shape.

10. A method according to claim 1 wherein said laser light is separated into two parts by a half mirror, and said energy measuring device measures an energy distribution of one of said two parts of said laser light.

11. A method according to claim 2 wherein said laser light is an excimer laser light.

12. A method according to claim 2 wherein said laser light has a linear shape.

13. A method according to claim 3 wherein said laser light is an excimer laser light.

14. A method according to claim 3 wherein said laser light has a linear shape.

15. A method according to claim 4 wherein said laser light is an excimer laser light.

16. A method according to claim 4 wherein said laser light has a linear shape.

17. A method according to claim 5 wherein said laser light is an excimer laser light.

18. A method according to claim 5 wherein said laser light has a linear shape.

19. A method according to claim 6 wherein said laser light is an excimer laser light.

20. A method according to claim 6 wherein said laser light has a linear shape.

21. A method according to claim 6 wherein said laser light is separated into two parts by a half mirror, and said energy measuring device measures an energy distribution of one of said two parts of said laser light.

22. A method according to claim 7 wherein said laser light is an excimer laser light.

23. A method according to claim 7 wherein said laser light has a linear shape.

24. A method according to claim 7 wherein said laser light is separated into two parts by a half mirror, and said energy measuring device measures an energy distribution of one of said two parts of said laser light.

25. A method according to claim 1 wherein said laser light comprises a pulsed laser light.

26. A method according to claim 2 wherein said laser light comprises a pulsed laser light.

27. A method according to claim 3 wherein said laser light comprises a pulsed laser light.

28. A method according to claim 4 wherein said laser light comprises a pulsed laser light.

29. A method according to claim 5 wherein said laser light comprises a pulsed laser light.

30. A method according to claim 6 wherein said laser light comprises a pulsed laser light.

31. A method according to claim 7 wherein said laser light comprises a pulsed laser light.

32. A method for forming a thin film transistor comprising; forming a semiconductor film comprising silicon over a substrate;
irradiating a CW laser light to said semiconductor film; and
receiving at least a portion of said CW laser light by an energy measuring device to measure at least a portion of an energy distribution of said CW laser light thereby.

33. A method for forming a thin film transistor comprising:
forming a semiconductor film comprising silicon over a substrate;
irradiating a CW laser light to said semiconductor film while relatively scanning said semiconductor film with said CW laser light in order that an energy measuring device measures an energy distribution of at least a portion of said CW laser light.

34. A method for forming a thin film transistor comprising:
forming a semiconductor film comprising silicon over a substrate;
producing a CW laser light from a laser;
attenuating said CW laser light by an energy attenuating device provided separately from said laser; and
irradiating the attenuated CW laser light to said semiconductor film.

35. A method for forming a thin film transistor comprising: forming a semiconductor film comprising silicon over a substrate;
producing a CW laser light from a laser;
directing said CW laser light to an energy attenuation filter of an energy attenuating device;
changing an intensity of a portion of said CW laser light by changing an angle formed by said energy attenuation filter and said CW laser light to output an attenuated CW laser light; and irradiating said attenuated CW laser light to said semiconductor film.

36. A method for forming a thin film transistor comprising:

forming a semiconductor film comprising silicon over a substrate;

producing at least one slot CW laser light from a laser;

measuring energy distribution of said at least one shot CW laser light by an energy measuring device to conduct control of said energy distribution; and irradiating said CW laser light to said semiconductor film with said energy distribution of said CW laser light determined by said control.

37. A method for forming a thin film transistor comprising:

forming a semiconductor film comprising silicon over a substrate;

producing a CW laser light from a laser;

splitting said CW laser light into a first portion and a second portion;

irradiating said first portion to said semiconductor film; and directing said control portion to an energy measuring device which measures an energy distribution of said second portion to determine an energy distribution of said first portion.

38. A method according to claim 32 wherein said CW laser light has a linear shape.

39. A method according to claim 32 wherein said CW laser light is separated into two parts by a half mirror, and said energy measuring device measures an energy distribution of one of said two parts of said CW laser light.

40. A method according to claim 33 wherein said CW laser light has a linear shape.

41. A method according to claim 34 wherein said CW laser light has a linear shape.

42. A method according to claim 35 wherein said CW laser light has a linear shape.

43. A method according to claim 36 wherein said CW laser light has a linear shape.

44. A method according to claim 36 wherein said CW laser light is separated into two parts by a half mirror, and said energy measuring device measures an energy distribution of one of said two parts of said laser light.

45. A method according to claim 37 wherein said CW laser light has a linear shape.

46. A method according to claim 37 wherein said CW laser light is separated into two parts by a half mirror, and said energy measuring device measures an energy distribution of one of said two parts of said CW laser light.

47. A method for forming a thin film transistor comprising:

forming a semiconductor film comprising silicon over a substrate;

producing a CW laser light from a laser; passing said CW laser light through an energy attenuation filter;

splitting said CW laser light into a first portion and a second portion; irradiating said first portion to said semiconductor film, directing said second portion to an energy measuring device which measures an energy of said second portion; and adjusting an angle formed between said CW laser light and said energy attenuation filter based on the measured energy of said second portion to determine an energy of said first portion.

48. A method according to claim 47 wherein said energy measuring device measures an energy distribution of said second portion, and an energy distribution of said first portion is determined by the adjustment of said angle.

49. A method according to claim 47 wherein said CW laser light is splitted into said first portion and said second portion after said CW laser light is passed through said energy attenuation filter.

50. A method for forming a thin film transistor comprising:

forming a semiconductor film comprising silicon over a substrate;

producing a laser light from a laser passing said laser light through an energy attenuation filter;

splitting said laser light into a first portion and a second portion;

irradiating said first portion to said semiconductor film;

directing said second portion to an energy measuring device which measures an energy of said second portion; and adjusting an angle formed between said laser light and said energy attenuation filter based on the measured energy of said second portion to determine an energy of said first portion.

51. A method according to claim 50 wherein said energy measuring device measures an energy distribution of said second portion, and an energy distribution of said first portion is determined by the adjustment of said angle.

52. A method according to claim 50 wherein said laser light is splitted into said first portion and said second portion after said laser light is passed through said energy attenuation filter.

53. A method according to claim 50 wherein said laser light comprises a pulsed laser light.

* * * * *